(12) United States Patent
Hessels et al.

(10) Patent No.: US 7,695,217 B2
(45) Date of Patent: Apr. 13, 2010

(54) ARRANGEMENT FOR AND METHOD OF INSTALLING BUILDING ELEMENTS

(75) Inventors: Johannes Louis Leonardus Hessels, Mierlo (NL); Robert Jan Van Foeken, Gouda (NL); Arris Van Duijvenboden, Katwijk Aan Zee (NL)

(73) Assignee: IHC Holland IE B.V., Sliedrecht (NL)

( * ) Notice: Subject to any disclaimer, the term of this patent is extended or adjusted under 35 U.S.C. 154(b) by 52 days.

(21) Appl. No.: 11/572,766

(22) PCT Filed: Jul. 26, 2005

(86) PCT No.: PCT/EP2005/053638

§ 371 (c)(1),
(2), (4) Date: Jul. 25, 2007

(87) PCT Pub. No.: WO2006/010758

PCT Pub. Date: Feb. 2, 2006

(65) Prior Publication Data

US 2007/0277989 A1    Dec. 6, 2007

(30) Foreign Application Priority Data

Jul. 27, 2004    (EP)    ................................. 04103599

(51) Int. Cl.
*E02D 7/06*    (2006.01)
(52) U.S. Cl. ........................... 405/232; 173/101; 173/90
(58) Field of Classification Search .................. 405/133, 405/232, 249; 173/90, 101, 104, 27
See application file for complete search history.

(56) References Cited

U.S. PATENT DOCUMENTS

| | | | | |
|---|---|---|---|---|
| 1,787,000 A | * | 12/1930 | Hunt | ........................... 405/249 |
| 3,115,198 A | * | 12/1963 | Kuss | ........................... 405/249 |
| 3,530,947 A | * | 9/1970 | Gendron | ..................... 405/249 |
| 3,595,324 A | | 7/1971 | Guild | |
| 3,686,877 A | * | 8/1972 | Bodin | ........................ 405/249 |
| 3,828,866 A | * | 8/1974 | Jansz | ......................... 173/101 |
| 4,365,306 A | * | 12/1982 | House et al. | ................... 173/20 |
| 5,653,556 A | | 8/1997 | White | |

(Continued)

FOREIGN PATENT DOCUMENTS

EP    0095801    5/1983

(Continued)

OTHER PUBLICATIONS

Official Search Report of the European Patent Office Patent Office in counterpart foreign application No. PCT/EP2005/053638 filed Jul. 26, 2005.

*Primary Examiner*—Frederick L Lagman
(74) *Attorney, Agent, or Firm*—Steven M. Koehler; Westman, Champlin & Kelly, P.A.

(57) ABSTRACT

An arrangement for installing building elements, such as piles and tunnel sections, into a ground formation, where a building element is provided. Two or more impact drivers for delivering blows to the element are mounted on or operatively connected to the element. Accordingly, large elements, such as monopiles for wind turbines, which may comprise a steel tube having a diameter in excess of 5 meters, or even tunnel sections, can be installed by utilizing a number of relatively small impact drivers.

20 Claims, 2 Drawing Sheets

U.S. PATENT DOCUMENTS

| | | | |
|---|---|---|---|
| 6,386,295 B1 * | 5/2002 | Suver | 405/232 |
| 6,672,805 B1 | 1/2004 | White | |
| 6,896,071 B1 * | 5/2005 | Collins | 173/1 |
| 6,908,262 B1 | 6/2005 | White | |
| 7,281,902 B2 * | 10/2007 | Mortensen | 416/244 R |

FOREIGN PATENT DOCUMENTS

| | | |
|---|---|---|
| EP | 1340856 | 9/2003 |

* cited by examiner

ARRANGEMENT FOR AND METHOD OF INSTALLING BUILDING ELEMENTS

CROSS-REFERENCE TO RELATED APPLICATION

The present application is a National Stage filing of and claims priority of International patent application Serial No. PCT/EP2005/053638, filed Jul. 26, 2005, and published in English the content of which is hereby incorporated by reference in its entirety.

BACKGROUND

The invention pertains to an arrangement for and a method of installing building elements, such as piles or tunnel sections, in particular mono-elements having a diameter in excess of 5 meters, into a ground formation, which arrangement comprises such a building element and an impact driver. The invention further pertains to an assembly to be mounted on or operatively connected to a building element.

Arrangements for installing building elements into a ground formation are generally known. For instance, European patent application 0 095 801 discloses a hydraulic pile driver including a housing having an impact weight mounted therein for reciprocating movement.

U.S. Pat. No. 3,595,324 discloses a pile driver which includes a plurality of hammers and a common anvil with aligning pads between the hammers and the anvil. The pile driver further includes means for phasing the operation of the hammers, means for compensating for the effects of unphased hammer operations, and/or combinations thereof.

SUMMARY

An arrangement according to an aspect of the present invention includes two or more impact drivers for delivering blows to a building element where the impact drivers are mounted on or operatively connected to the element. It is preferred that each of the drivers has a maximum blow energy in a range from 90 to 3200 kiloJoule, more preferably in a range from 90 to 900 kiloJoule, most preferably in a range from 150 to 750 kilojoule.

With the invention, large elements, such as monopiles for wind turbines, which may essentially consist of a steel tube having a diameter in excess of 5 meters, or even tunnel sections, can be installed by means of a number of relatively small impact drivers.

Also, at large project sites, it is customary to have at least one spare driver present. With the invention, one or two relatively small spare drivers—as opposed to one very large spare driver—suffice, resulting in considerable savings and much simpler handling.

In one embodiment, each of the impact drivers comprises an individual anvil for transferring blow energy from the respective impact driver to the element, since it will then be possible to install large elements without the need for an equally large anvil. Anvils having a diameter of e.g. 5 meters or more are very difficult to manufacture and handle. Furthermore, it appears that two or more smaller anvils allow a more efficient transfer of blow energy than one larger anvil.

At least for symmetrical building elements, it is further preferred that the impact drivers all have the same or substantially the same maximum blow energy and/or are evenly distributed over the circumference or rim of the element.

It is further preferred that the central axis of at least one, preferably each of the impact weights is aligned with the respective local centre of mass of the cross section of the wall of the element covered by the anvil. Properly aligned impact weights reduce bending forces in the element and reduce so-called "life time consumption" resulting from such bending forces.

Although asynchronous driving can be useful, e.g. at sites where the soil resistance is low or when the forces applied to the pile should be relatively small, it is generally preferred that the arrangement comprises a control system for synchronizing the blows to be delivered to the element, preferably within 10 milliseconds, more preferably within 5 milliseconds, most preferably within 2 milliseconds. By synchronizing the blows, life time consumption is further reduced and the energy of the blows is transmitted to the element more efficiently.

An aspect of the invention also pertains to an assembly to be mounted on or operatively connected to a building element comprising two or more impact drivers mounted on a common frame, which frame is preferably adjustable to the dimensions of the element.

An aspect of the invention further pertains to a method of installing a building element, such as a pile or a tunnel section, into a ground formation, comprising the steps of: bringing the element in position, mounting or operatively connecting two or more impact drivers on respectively to the element, driving the element into the ground formation by simultaneously operating two or more impact drivers.

It is preferred that the blows are synchronized within 10 milliseconds, preferably within 5 milliseconds, more preferably within 2 milliseconds.

BRIEF DESCRIPTION OF THE DRAWINGS

Aspects of the invention will now be explained in more detail with reference to the attached figures, which shows a preferred example of the arrangement according to the present invention.

DETAILED DESCRIPTION

Figure 1:
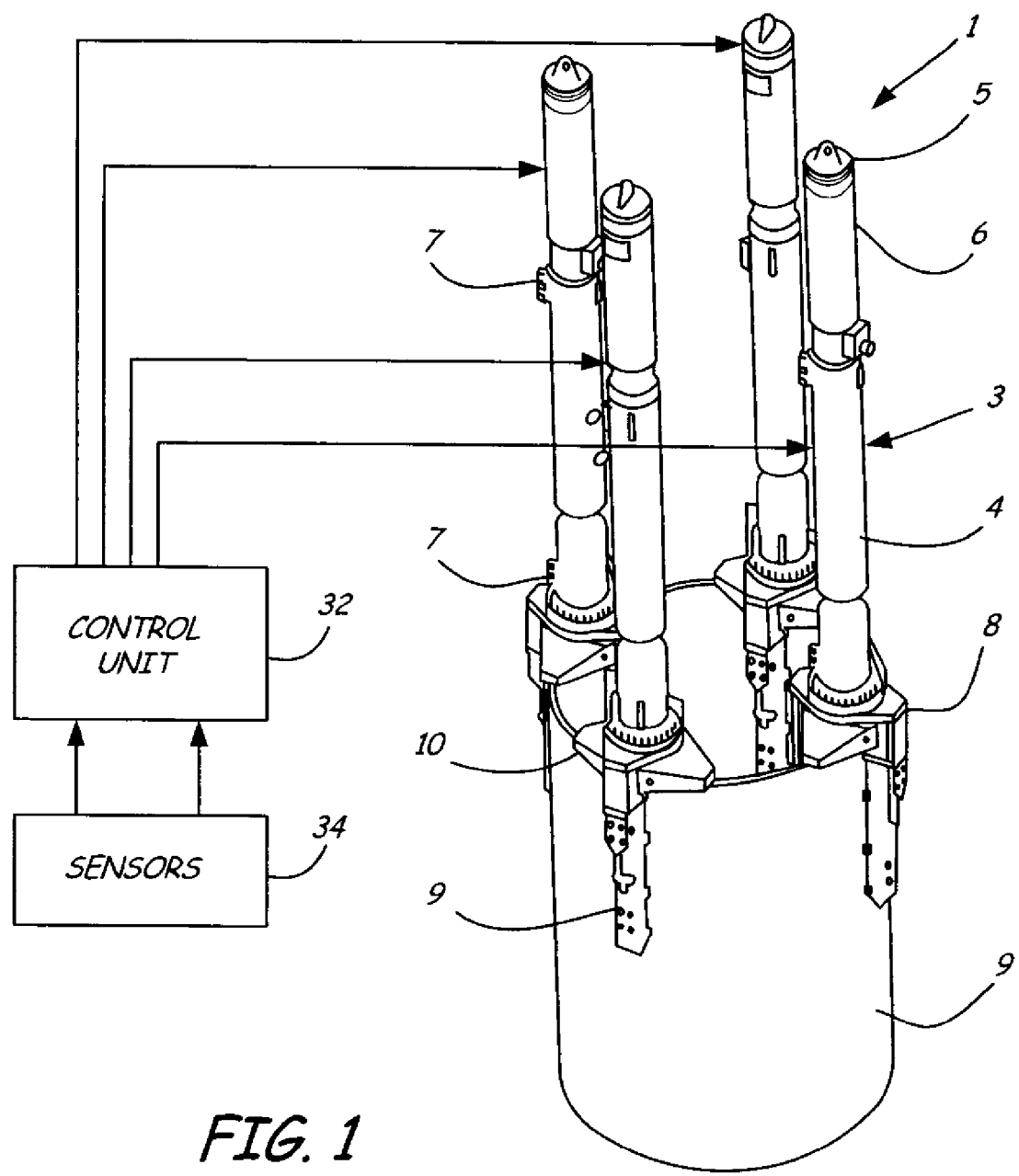
FIG. 1 is a perspective view of an arrangement according to the present invention comprising four hydraulic drivers mounted on a monopile.

Arrangement 1 comprises a foundation element, in this case a vertical so-called monopile 2 for a wind turbine, which pile 2 consists of a steel tube having a diameter of 6 meters, and four separate hydraulic pile drivers 3 evenly distributed over the upper rim of the pile 2, i.e. 90[°] apart. The hydraulic pile drivers 3 are known in the art and include a housing 4 provided on its upper end with an eye 5, for lifting and handling the driver 3 with a crane, and having an impact weight mounted therein for reciprocating movement. For further details of these drivers reference may had to European patent application 0 095 801. Preferred drivers are the S-90 to S-900 and SC-IlO to SC-250 hammers ex IHC Hydrohammer B.V. In this particular example, a S-280 was employed.

The drivers 3 were individually mounted on the pile 2. However, it is also possible to interconnect the drivers by a frame (not shown), which is adjustable to the dimensions of the pile and which comprises e.g. two crossing telescopic beams. In that case, an assembly of the drivers and the frame can be mounted on a pile, which has been brought in position, or an assembly of the drivers, the frame, and the pile can be brought in position in its entirety.

Further, the drivers 3 are connected, via fluid connectors 6, to two hydraulic pressure sources (not shown), preferably so-called power packs, e.g. two P-1600W ex IHC Hydrohammer B.V., mounted on the frame. Upper and lower attachments 7, forming an integral part of the housing 4, may serve to secure the drivers 3 to leader guides or to the said frame. Instead, it is also possible to connect all drivers to a single pressure source or each driver to individual pressure sources.

The lower end of each of the drivers 3 is attached, by means of a flange 8 and bolts, to a U-shaped pile sleeve 9, adapted to abut both sides of the wall of the pile 2, and an anvil 10, such as those used when driving sheet piles. The anvil 10 is relatively long in a direction tangential to the upper rim of the pile 2 so as to effectively transmit the energy of the blows, delivered by the drivers 3, to the pile 2.

During operation, the pile 2 is positioned with respect to a ground formation, the individual drivers 3 are mounted on the pile 2, and the pile 2 is driven into the ground by blows that are being synchronized within 5 milliseconds by means of a control unit.

Synchronization can be achieved in several ways. For instance by providing sensors 34, such as proximity switches (preferred), hydraulic pressure gauges or accelerometers, in respectively on each of the drivers, designating one of the drivers as 'master' and the other drivers as 'slave', calculating or measuring the moment of impact for each of the drivers, calculating, for each of the slaves, the difference, typically in milliseconds, with the moment of impact of the master and adjusting the timing of the blows of the slaves by the calculated differences.

In a first and preferred alternative embodiment, the time of fall needed and energy delivered by the impact weight of each of the individual drivers is established for several lifting heights. Based on this information, the control unit 32 will drive each of the weights to be lifted to a height that corresponds to a pre-selected blow energy and time the release of the weights such that the blows are delivered substantially simultaneously.

Figure 2:
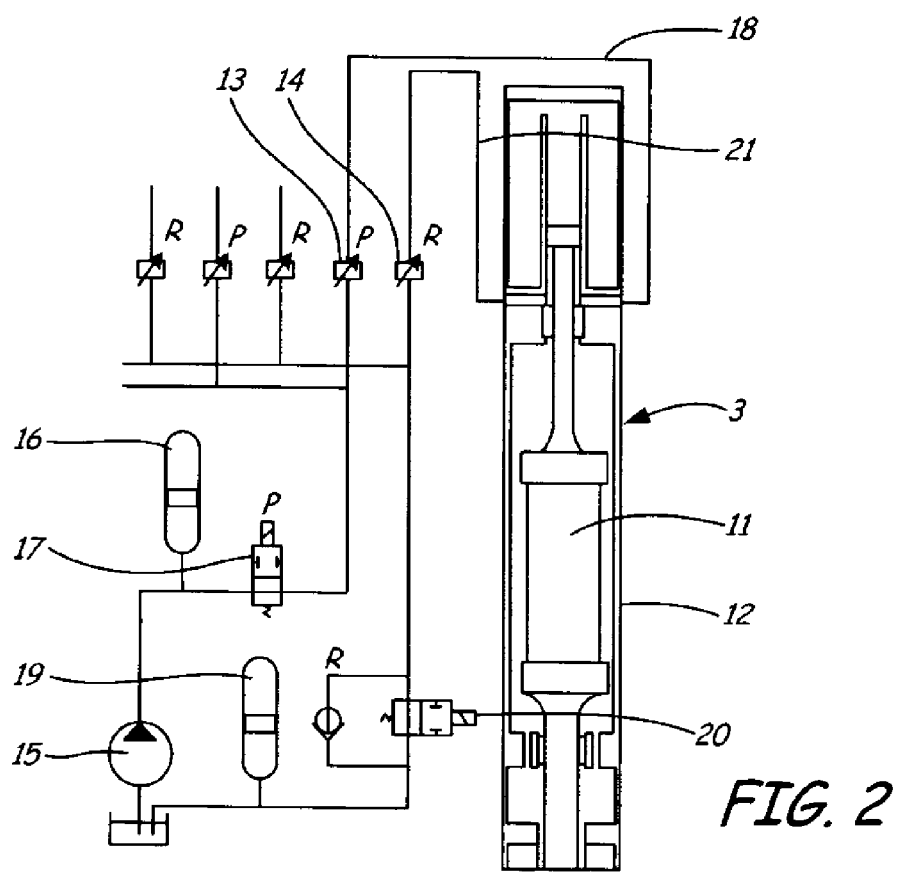
FIG. 2 schematically shows a means for synchronizing the blows delivered by the drivers.

In a second alternative embodiment, shown in FIG. 2, all drivers 3, each comprising an impact weight 11, reciprocatingly mounted inside a housing 12, are controlled as a single driver and are connected, via flow regulating valves 13, 14 to a hydraulic control system. This system comprises one or more hydraulic pressure sources 15, a high pressure accumulator 16, connected, via a first valve 17 to the pressure line 18 of each of the drivers 3, and a low pressure accumulator 19, connected, via a second valve 20 to the return line 21 of each of the drivers 3. When the first valve 17 opens, pressurized hydraulic fluid is distributed over the drivers 3 and the impact weights 11 are lifted. The flow regulating valves 13 ensure that a substantially equal amount of hydraulic fluid flows to each of the drivers 3 at a substantially equal rate, thus synchronizing the impact weights 11. When the first valve 17 closes and the second valve 20 opens, the impact weights 11 fall and a substantially equal amount of hydraulic fluid flows from each of the drivers 3 and through flow regulating valves 14, again synchronizing the same.

Figure 3:
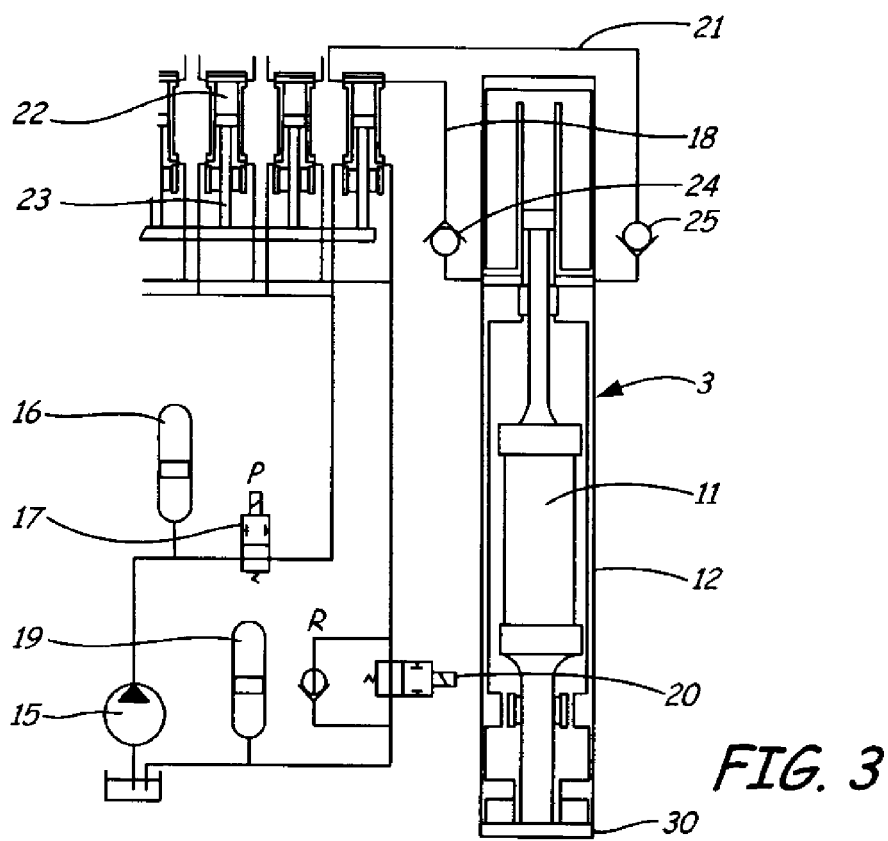
FIG. 3 schematically shows a further means for synchronizing the blows delivered by the drivers.

In a third alternative embodiment, shown in FIG. 3, the flow regulating valves have been replaced with synchronizing cylinders 22, hydraulically separating the hydraulic control system form the drivers 3. The pistons 23 are rigidly interconnected and are all in the same position relative to the respective cylinders 22. Further, the pressure and return lines 18, 21, are provided with nonreturn valves 24, 25. When the first valve 17 opens, pressurized hydraulic fluid is distributed over the cylinders 22 and all pistons 23 are displaced over a substantially equal distance. As a consequence, the hydraulic fluid flows, through the pressure lines 18 and the non-return valves 24, to each of the drivers 3, The rigidly interconnected pistons ensure that a substantially equal amount of hydraulic fluid flows to each of the drivers 3 at a substantially equal rate, thus synchronizing the impact weights 11. When the first valve 17 closes and the second valve 20 opens, the impact weights 11 fall and a substantially equal amount of hydraulic fluid flows from each of the drivers 3, urging the pistons 23 outwards, all at an equal rate, thus again synchronizing the impact weights 11.

If more accurate measurements are required, for instance if the foundation element is relatively fragile, such as a large hollow concrete (mono)piles, or if the nature of the ground formation complicates driving, sensors, such a accelerometers and strain gauges, can be provided on the foundation element itself. Data obtained with these sensors can be employed to synchronize the blows and to calculate the distribution of the energy delivered to the element as well as bending forces in the element and the life time consumption resulting from such bending forces.

It is noted that hydraulic drivers are particularly suitable for use in the arrangement according to the present invention, because the flow of hydraulic liquid and the timing of the valves, and thus respectively the frequency and the stroke of the ram (blow energy), are mutually independently adjustable and can be employed to effectively synchronize and equalize the blows.

When elements, such as tunnel sections, are to be driven into a ground formation at an inclination or horizontally, it is preferred to employ drivers that comprise a spring, preferably a substantially gastight chamber containing a pressurized gas, which is in fluid communication with part of the ram, preferably its upper surface. By moving the ram in a direction compressing the gas e.g. by means of a supply source for liquid under pressure, as is the case in hydraulic drivers, the ram can be subsequently accelerated by the pressurized gas at an acceleration of e.g. 2 g, even if the driver is at an inclination or horizontally. Furthermore, the pressure in the gas can be employed as a further parameter for controlling the moment of impact and hence for synchronizing the drivers and/or the blow energy can be increased or decreased by increasing respectively decreasing the pressure of the gas. For details of drivers equipped with a so-called pressure cap reference may again be had to European patent application 0 095 801.

Synchronization can be facilitated by extending the duration of the blows by providing the anvil with a so-called cushion 30, known in itself. Preferable materials for such a cushion are plastics and wood.

From the above explanations, it will be clear that, with the invention, large elements, such as monopiles for wind turbines or even tunnel sections, can be installed by means of a number of relatively small drivers.

The invention is not restricted to the above-described embodiments, which can be varied in a number of ways within the scope of the claims.

For instance, the arrangement and method according to the invention can be employed for driving asymmetrical or non-axissymmetrical building elements into a ground formation. By using two or more drivers, the distribution of the energy delivered by the blows can be accurately tuned to the requirements of the asymmetrical or non-axissymmetrical element, both in terms of shape and in terms of mass e.g. if an element has one or more relatively thick portions.

Further, instead of employing impact drivers all having the same maximum blow energy, it is also possible to employ drivers having different maximum blow energies and e.g. operating the same to deliver equal blows. It is also noted that, during driving an element into a ground formation, the orientation of the element can be corrected by delivering unequal blows.

The invention claimed is:

1. An arrangement for installing building elements into a ground formation, which arrangement comprises such a building element and includes two or more impact drivers configured to deliver blows to the element, where the impact drivers are mounted on or operatively connected to the element and a control system coupled to each of the impact drivers and configured to operate each of the impact drivers individually to synchronize the blows to be delivered to the element within 10 milliseconds of each other.

2. The arrangement according to claim 1, wherein each of the impact drivers has a blow energy in a range from 90 to 3200 kiloJoule.

3. The arrangement according to claim 1, wherein each of the impact drivers comprises an individual anvil configured to transfer blow energy from the respective impact driver to the element.

4. The arrangement according to claim 3, wherein at least one of the anvils is provided with a cushion so as to extend the duration of the blow of the respective impact driver.

5. The arrangement according to claim 1 wherein the impact drivers all have the same or substantially the same maximum blow energy.

6. The arrangement according to claim 1 wherein the impact drivers are evenly distributed over a circumference of the element.

7. The arrangement according to claim 6, wherein the control system is adapted to synchronize the blows within 5 milliseconds.

8. The arrangement according to claim 1, wherein the control system is adapted to designate one of the drivers as 'master' and the other drivers as 'slave', calculate or measure the moment of impact for each of the drivers, calculate, for each of the slaves, the difference, with the moment of impact of the master and adjust the timing of the blows of the slaves by the calculated differences.

9. The arrangement according to claim 1, wherein the amount of energy and the frequency of the blows of at least one of the impact drivers are mutually independently adjustable.

10. The arrangement according to claim 1 wherein at least one of the impact drivers is a hydraulic impact driver.

11. The arrangement according to claim 10, wherein at least two of the impact drivers are hydraulic impact drivers and the arrangement further comprises a system configured to synchronize the blows, the system comprising synchronized hydraulic control cylinders.

12. The arrangement according to claim 11, wherein the hydraulic control cylinders include pistons, which have been rigidly interconnected.

13. An assembly to be mounted on or operatively connected to a building element comprising two or more impact drivers mounted on a common frame wherein each impact driver includes a separate anvil configured to transfer force to the to the building element and a control system coupled to the two or more impact drivers and configured to synchronize the blows of the anvils that are delivered to the building element.

14. The assembly according to claim 13, wherein the frame is adjustable to the dimensions of the element.

15. A method of installing a building element comprising: bringing the element in position, operatively connecting two or more impact drivers to the element wherein each impact driver includes a separate anvil configured to deliver a force to the building element, and driving the element into the ground formation by simultaneously operating the two or more impact drivers such that the separate anvils deliver separate forces to the building element within at least 10 milliseconds of each other.

16. The method according to claim 15, wherein the blows are synchronized within at least 5 milliseconds of each other.

17. An assembly for installing a building element into a ground formation comprising:
  two or more impact drivers, each driver having an anvil; and
  a control system coupled to the two or more impact drivers and configured to synchronize movement of the anvils for impacting the element where impact is within 10 milliseconds of each other.

18. An assembly to be mounted on or operatively connected to a building element comprising:
  two or more impact drivers mounted on a common frame wherein each impact driver includes a separate anvil for transferring force to the to the building element; and
  a control system coupled to the two or more impact drivers and configured to control the timing between movement of the anvils when such movement is for impacting the building element with each respective element.

19. The assembly of claim 18 and wherein movement of the anvils is controlled to be within 10 milliseconds of each other.

20. The assembly of claim 18 and wherein the control system comprises a hydraulic control system.

* * * * *